(12) United States Patent
Hong

(10) Patent No.: US 7,085,049 B2
(45) Date of Patent: Aug. 1, 2006

(54) MULTI-MODE STEREOSCOPIC IMAGE DISPLAY METHOD AND APPARATUS

(75) Inventor: Hyung Ki Hong, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/055,890

(22) Filed: Jan. 28, 2002

(65) Prior Publication Data
US 2002/0114072 A1 Aug. 22, 2002

Related U.S. Application Data

(63) Continuation-in-part of application No. 09/618,447, filed on Jul. 18, 2000, now abandoned.

(30) Foreign Application Priority Data
Jul. 19, 1999 (KR) .............................. P1999-29143

(51) Int. Cl.
*G02B 27/22* (2006.01)
(52) U.S. Cl. .................... 359/464; 359/462; 348/60
(58) Field of Classification Search ............... 359/462, 359/464, 466; 348/51, 60, 54
See application file for complete search history.

(56) References Cited

U.S. PATENT DOCUMENTS

| 5,315,377 | A | | 5/1994 | Isono et al. |
| 5,410,345 | A | | 4/1995 | Eichenlaub |
| 5,751,479 | A | * | 5/1998 | Hamagishi et al. ......... 359/464 |
| 5,825,337 | A | * | 10/1998 | Wiseman et al. .............. 345/6 |
| 5,945,965 | A | | 8/1999 | Inoguchi et al. |
| 6,252,707 | B1 | | 6/2001 | Kleinberger et al. |

* cited by examiner

*Primary Examiner*—Audrey Chang
(74) *Attorney, Agent, or Firm*—Birch, Stewart, Kolasch & Birch, LLP

(57) ABSTRACT

A multi-mode stereoscopic image display method and apparatus wherein a plane picture and a stereoscopic picture can be displayed on a single display device. In the method and apparatus, video signals obtained by photographing an object at different angles are displayed on a display unit and a mode signal for assigning a stereoscopic mode or a plane mode is generated. In a stereoscopic mode, a picture displayed on the display unit is separated into a left-eye picture and a right-eye picture being incident to the left eye and the light eye of an observer. In a plane mode, said picture displayed on the display unit is transmitted to the observer without change.

22 Claims, 10 Drawing Sheets

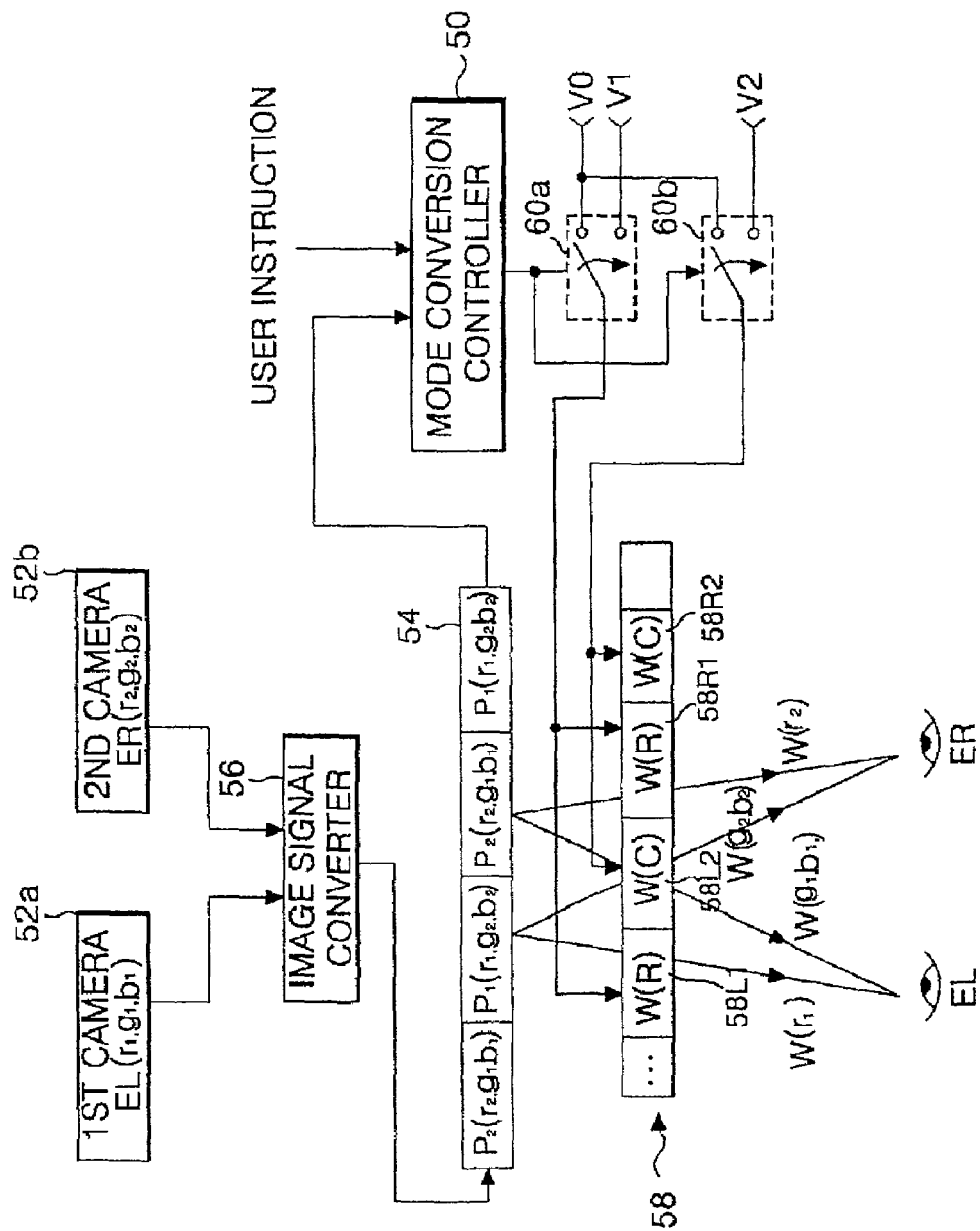

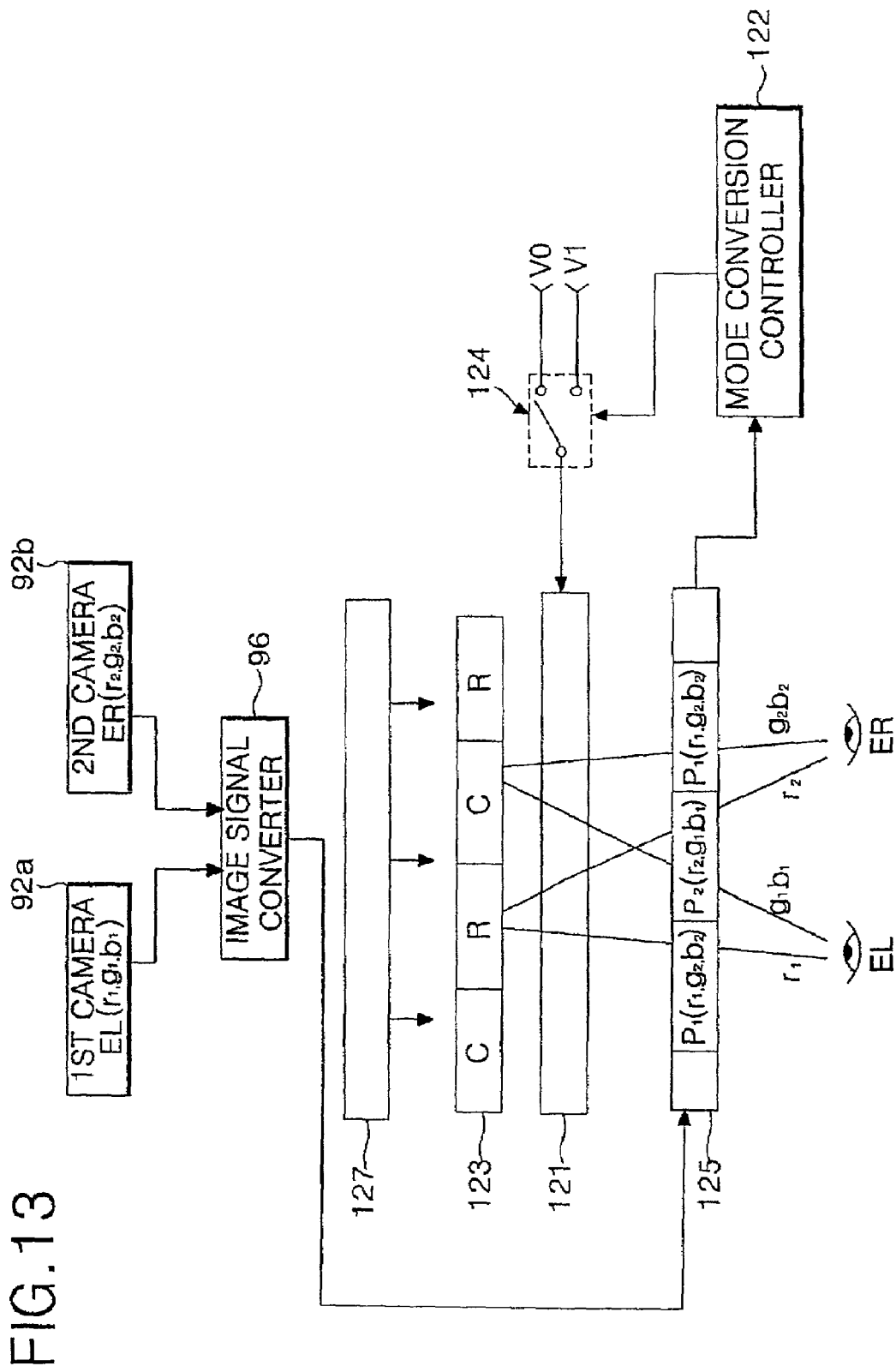

MULTI-MODE STEREOSCOPIC IMAGE DISPLAY METHOD AND APPARATUS

RELATED APPLICATIONS

This is a continuation-in-part application of application Ser. No. 09/618,447 filed on Jul. 18, 2000 now abandoned the entire contents of which are hereby incorporated by reference, and for which priority is claimed under 35 U.S.C.§ 120; and this application claims priority of Application No. P99-29143 filed in KOREA on Jul. 19, 1999 under 35 U.S.C. § 119.

BACKGROUND OF THE INVENTION

1. Field of the Invention

The present invention relates to a display device, and more particularly to a multi-mode stereoscopic image display method and apparatus wherein a plane picture and a stereoscopic picture can be displayed on a single display device.

2. Description of the Related Art

Generally, a display device is classified into a plane picture display device for displaying an image obtained by photographing an object using a single camera and a stereoscopic picture display device for combining two images obtained by photographing an object using two cameras positioned at different angles with respect to the same object to display an image.

The plane picture display device permits an observer to view a plane picture without a cubic effect because an identical picture is simultaneously incident to a left-eye and a right-eye of an observer.

On the other hand, the stereoscopic picture display device displays a picture being incident to the left-eye of an observer, hereinafter referred to as "left-eye picture" and a picture being incident to the right-eye of an observer, hereinafter referred to as "right-eye picture", on a screen at the same time. The observer feels a cubic effect because he observes a picture displayed on the stereoscopic picture display device in a state in which the left-eye picture is combined with the right-eye picture. Such a stereoscopic picture display device includes a system that requires glasses for viewing and a system that does not require glasses for viewing.

Referring to FIG. 1, a stereoscopic picture display device requiring glasses includes first and second cameras 2a and 2b for photographing an object at a different angle, a display unit 14 for separating color signals of an image received from the first and second cameras 2a and 2b, and glasses 6 to be worn by an observer.

The first camera 2a photographs an object into red(r1), green(g1) and blue(b1) color images, and sends a video signal corresponding to the red color r1 to the display unit 14. The second camera 2b photographs an object into red(r2), green(g2) and blue(b2) color images at an angle different from the first camera 2a, and sends a video signal corresponding to the green color g2 and the blue color b2 to the display unit 14.

The display unit 14 displays a color picture using the red(r1), green(g2) and blue(b2) video signals received from the first and second cameras 2a and 2b. The glasses 6 include a left-eye lens and a right-eye lens. The left-eye lens is comprised of a red filter passing only a red color while the right-eye lens is comprised of a cyan filter passing only green and blue colors.

Since an observer views a red picture photographed by the first camera 2a via the red filter and green and blue pictures photographed by the second camera 2b via the cyan filter at the same time by his left and right eyes, respectively, he observes the same object at a different angle by his left and right eyes. Accordingly, the observer recognizes a picture displayed on the display unit 14 as a stereoscopic picture because the left-eye picture is combined with the right-eye picture in his head.

Meanwhile, the glasses 6 may be comprised of a single color filter other than the red filter and a complementary color filter or the single color filter. For example, the glasses 6 may consists of a green filter and a magenta filter, or a blue filter and a yellow filter.

However, the stereoscopic picture display device shown in FIG. 1 not only causes an observer an inconvenience in that he must wear glasses, but also it has a problem in that it is difficult to display and observe a stereoscopic picture having the original color of an object.

FIG. 2 and FIG. 3 illustrate a conventional stereoscopic display device that does not require glasses.

Referring to FIG. 2, the stereoscopic display device includes a display unit for displaying images from first and second cameras (not shown) alternately in a pixel unit, and a parallax barrier 22 opposed to a display screen of the display unit 24.

The display device 24 receives video signals from the first and second cameras photographing an object at a different angle. A first pixel P1 and a second pixel P2 of the display unit 24 are arranged in such a manner to be alternated with each other. A video signal inputted from the first camera is displayed on the first pixel P1 while a video signal inputted from the second camera is displayed on the second pixel P2. Herein, the first and second pixels P1 and P2 display a picture by three initial colors including red, green and blue sub-pixel cells, unlike the display unit 14 of FIG. 1.

The parallax barrier 22 is arranged in such a manner to interact with the first and second pixels P1 and P2 of the display unit 24, and includes an opaque filter 22a and transparent filters 22L and 22R that are alternated with each other. The opaque filter 22a and the transparent filters 22L and 22R provided at the parallax barrier 22 may be arranged in a stripe shape or in a mosaic shape. In the adjacent transparent filters 22L and 22R, the first transparent filter 22L, positioned at the left side, transmits light inputted from the first pixel P1 toward the left-eye EL of an observer. The second transparent filter 22R transmits light inputted from the second pixel P2 into the right-eye ER of an observer. The opaque filter 22a arranged between the first and second transparent filters 22L and 22R shuts off light inputted from the first pixel P1 and then progressed into the right-eye ER of an observer, and shuts off light inputted from the second pixel P2 and then progressed into the left-eye EL of an observer.

Since the right-eye picture and the left-eye picture are separated by the parallax barrier 22 in this manner, an observer views only a picture at the first pixel P1 via his left-eye EL, and only a picture at the second pixel P2 at his right-eye ER. Accordingly, the observer views a picture photographed at different angles at the same time via his left-eye EL and his right-eye ER, so that he recognizes a picture displayed on the display unit 24 as a stereoscopic picture.

However, the stereoscopic picture display device shown in FIG. 2 has a deterioration in brightness caused by the opaque filter 22a. Furthermore, brightness deterioration becomes worse because the number and the density of the opaque filter 22a are increased for implementation of a wider viewing angle.

In order to overcome brightness deterioration of such a parallax barrier 22, there has been suggested a stereoscopic picture display device employing a color barrier in which the opaque filter 22a does not exist.

Referring to FIG. 3, the stereoscopic picture display device employing a color barrier includes first and second cameras 32a and 32b for photographing an object at different angles, an image signal converter 36 for converting images inputted from the first and second cameras 32a and 32b into a stereoscopic image format to send the same to a display unit 34, and a color barrier 38 opposed to the display screen of the display unit 34.

The image signal converter 36 combines video signals received from the first and second cameras 32a and 32b such that the video signals inputted from the first and cameras 32a and 32b are arranged alternately, to thereby convert them into a stereoscopic picture format.

A mixed image signal from the image signal converter 36 is inputted to the display unit 34. Each of the first and second pixels P1 and P2 of the display unit 34 includes red, green and blue sub-pixel cells. A red video signal r1 from the first camera 32a and green and blue video signals g2 and b2 from the second camera 34a are displayed on the first pixel P1 of the display unit 34. On the other hand, a red video signal r2 from the second camera 32b and green and blue video signals g1 and b1 from the first camera 32a are displayed on the second pixel P2 of the display unit 34.

The color barrier 38 includes red filters 38R1 and 38R2 and a cyan filter, which interact with the first and second pixels P1 and P2 and are alternated with each other. The first red filter 38R1 positioned at the left side of the adjacent red filters 38R1 and 38R2, transmits a red light r1 inputted from the first pixel P1 toward the left-eye of an observer while shutting off light having other wavelength bands. On the other hand, the second red filter 38R2 positioned at the right side transmits red light r2 inputted from the second pixel P2 toward the right-eye of an observer while shutting off light having other wavelength bands. The cyan filter 38C arranged between the first and second red filters 38R1 and 38R2 shuts off red light, and transmits green and blue lights g2 and b2 inputted from the first pixel P1 toward a right-eye ER of an observer while transmitting green and blue lights g1 and b1 toward the left-eye EL of an observer.

In the meantime, the color barrier 38 may be comprised of a green filter and a magenta filter, or a blue filter or a yellow filter rather than a red filter and a cyan filter.

Since the right-eye picture and the left-eye picture are separated by the color barrier 38 in this manner, an observer views only a picture at the first pixel P1 via his left-eye EL and only a picture at the second pixel P2 at his right-eye ER. Accordingly, the observer views a picture photographed at different angles at the same time via his left-eye EL and his right-eye ER, so that he recognizes a picture displayed on the display unit 34 as a stereoscopic picture.

Such a conventional stereoscopic picture display device has a problem in that, since all images are displayed by a stereoscopic picture independently of a kind of picture and a user's selection, they have more deterioration in definition than a plane picture upon displaying text information or a stationary picture. Accordingly, there is a need for a stereoscopic picture display device that is capable of selectively displaying a plane picture and a stereoscopic picture depending based upon a user's selection of the kind of picture desired.

SUMMARY OF THE INVENTION

Accordingly, it is an object of the present invention to provide a multi-mode stereoscopic image display method and apparatus wherein a plane picture and a stereoscopic picture can be displayed by a single display unit.

In order to achieve these and other objects of the invention, a method of displaying a multi-mode stereoscopic image according to one aspect of the present invention includes the steps of displaying video signals obtained by photographing an object at different angles on a display unit; generating a mode signal for assigning a stereoscopic mode or a plane mode; separating a picture displayed on the display unit into a left-eye picture and a right-eye picture being incident to the left eye and the right eye of an observer in the stereoscopic mode; and transmitting the picture displayed on the display unit toward the observer "as it is" in the plane mode.

A multi-mode stereoscopic image displaying apparatus according to another aspect of the present invention includes an image signal converter for combining video signals obtained by photographing an object at a different angle; a light source for generating light; a display device for taking advantage of light inputted from the light source to display the video signals received from the image signal converter; and a variable color barrier for separating a picture on the display device into a left-eye picture and a right-eye picture in response to first and second voltages set to a different voltage level in a stereoscopic mode while transmitting said picture on the display device (without change) in response to a third voltage other than said first and second voltage in a plane mode, said barrier being opposed to the display device and having adjacent pixels alternated with each other in such a manner to have a complementary color relationship.

In the multi-mode stereoscopic image display apparatus, the variable color barrier is arranged at the front side of the display device.

Otherwise, the variable color barrier is arranged between the light source and the display device.

Herein, the variable color barrier is a liquid crystal display panel adopting any one of an electrically controlled birefringence (ECB) mode and a guest-host (GH) mode.

The multi-mode stereoscopic image display apparatus further includes a mode conversion controller for receiving a user instruction and generating a mode signal for assigning the stereoscopic mode or the plane mode in accordance with the user instruction; a voltage source for generating said first to third voltages; and a switch connected between the variable color barrier and the voltage source to apply said first to third voltages to the variable color barrier in response to the mode signal.

A multi-mode stereoscopic image displaying apparatus according to still another aspect of the present invention includes an image signal converter for combining video signals obtained by photographing an object at different angles; a light source for generating light; a display device for taking advantage of light inputted from the light source to display the video signals received from the image signal converter; a color barrier having adjacent pixels alternated with each other in such a manner to have a complementary color relationship; and a light-scattering device, being arranged between the display device, for transmitting an incident light without change, in response to a first voltage in a stereoscopic mode and scattering said incident light in response to a second voltage other than said first voltage in a plane mode.

In the multi-mode stereoscopic image display apparatus, the light-scattering device includes a polymer-dispersed liquid crystal (PDLC).

The multi-mode stereoscopic image display apparatus further includes a mode conversion controller for receiving a user instruction and generating a mode signal for assigning the stereoscopic mode or the plane mode in accordance with the user instruction; a voltage source for generating said first and second voltages; and a switch connected between the variable color barrier and the voltage source to apply said first and second voltages to the variable color barrier in response to the mode signal.

These and other objects of the present invention will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 6 is a schematic block diagram showing the configuration of a multi-mode stereoscopic image display device according to an embodiment of the present invention;

FIG. 13 is a schematic block diagram showing the configuration of a multi-mode stereoscopic image display device according to a fourth embodiment of the present invention.

DETAILED DESCRIPTION OF THE PREFERRED EMBODIMENT

Figure 1:
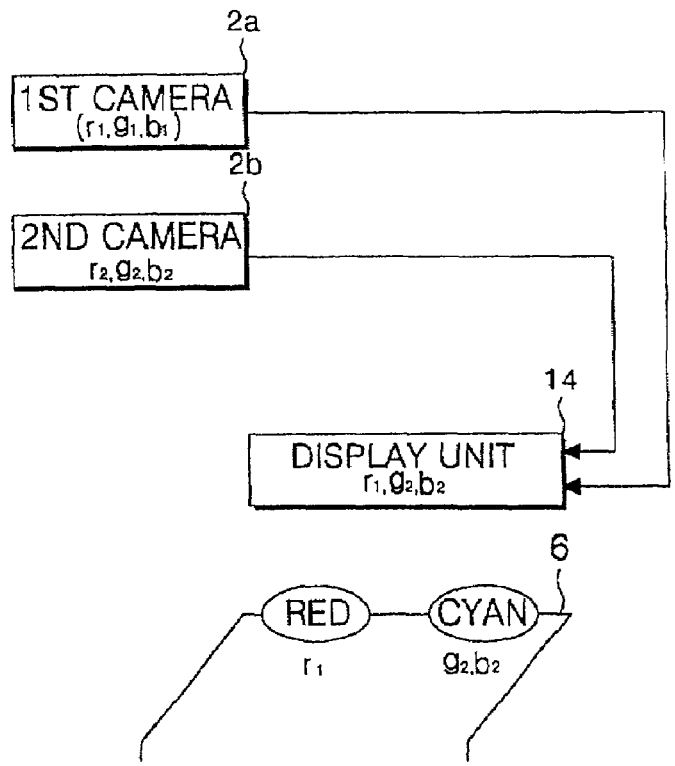
FIG. 1 is a schematic block diagram showing the configuration of a conventional stereoscopic image display device employing glasses.
Figure 2:
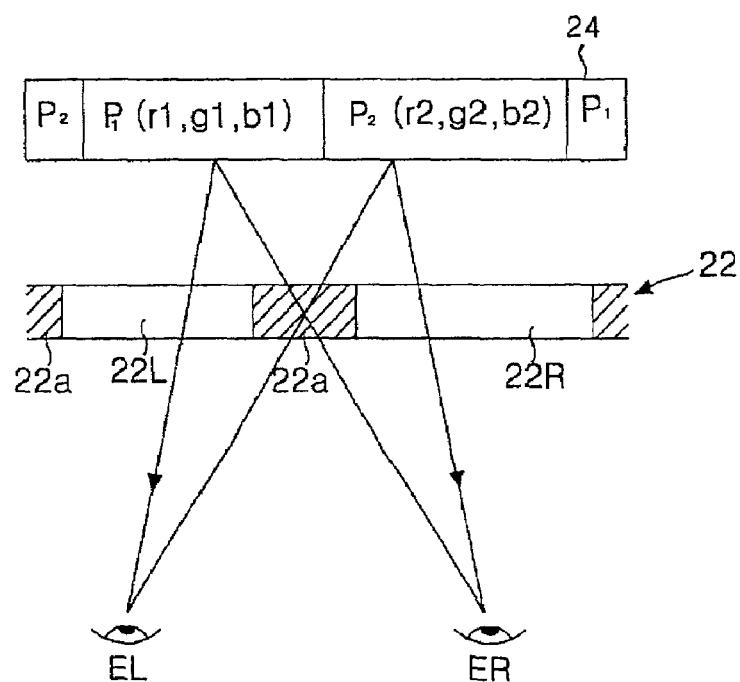
FIG. 2 is a schematic view showing the configuration of a conventional stereoscopic image display device with no glasses.
Figure 3:
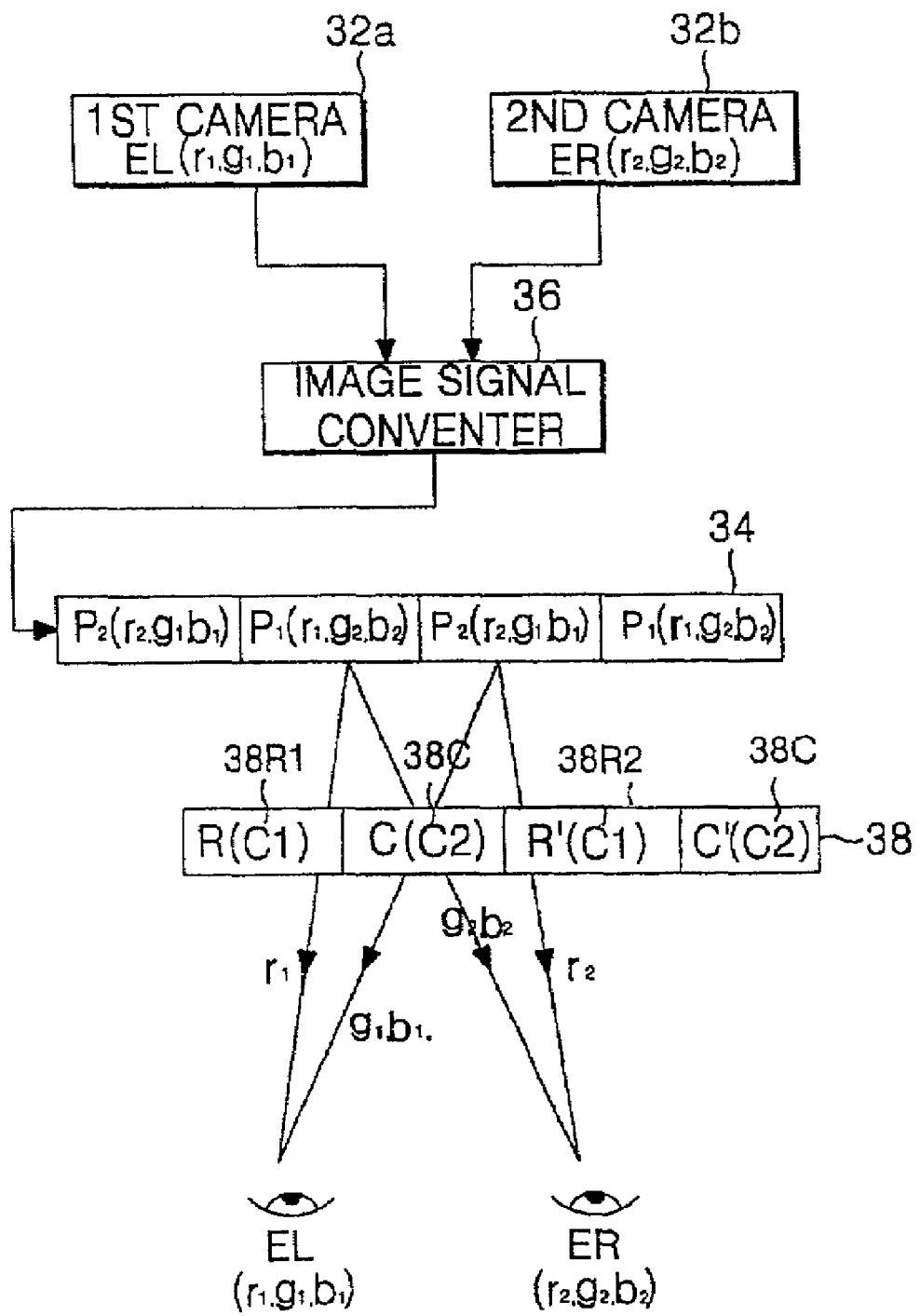
FIG. 3 is a view for explaining another example of the conventional stereoscopic image display device with no glasses.
Figure 4:
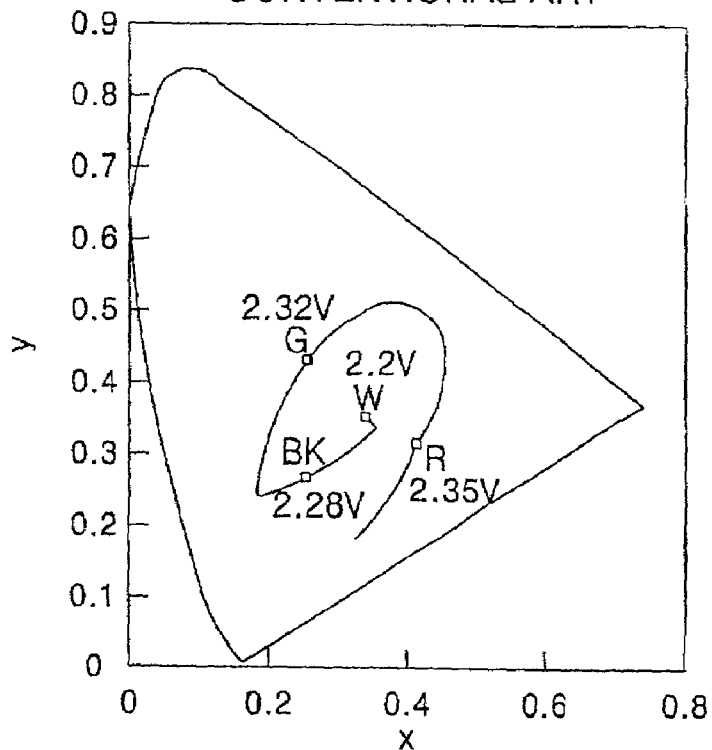
FIG. 4 is a graph for explaining a change in a wavelength transmitted in accordance with a voltage applied to a liquid crystal.

FIG. 4 shows a change in a wavelength transmitted from a liquid crystal cell in accordance with a voltage applied to the liquid crystal cell. For instance, the liquid crystal cell transmits a white light W when it is supplied with a voltage of 2.2V, whereas it shuts off all wavelength bands of light when it is supplied with a voltage of 2.28V, thereby displaying black BK. Further, the liquid crystal cell mainly transmits a light G with a green wavelength band when it is supplied with a voltage of 2.32V, whereas it mainly transmits a light R with a green wavelength band when it is supplied with a voltage of 2.35V. A liquid crystal mode having a light wavelength modulated in accordance with a supply voltage in this manner includes an electrically controlled birefringence (ECB) mode or a guest-host (GH) mode, etc.

Figure 5:
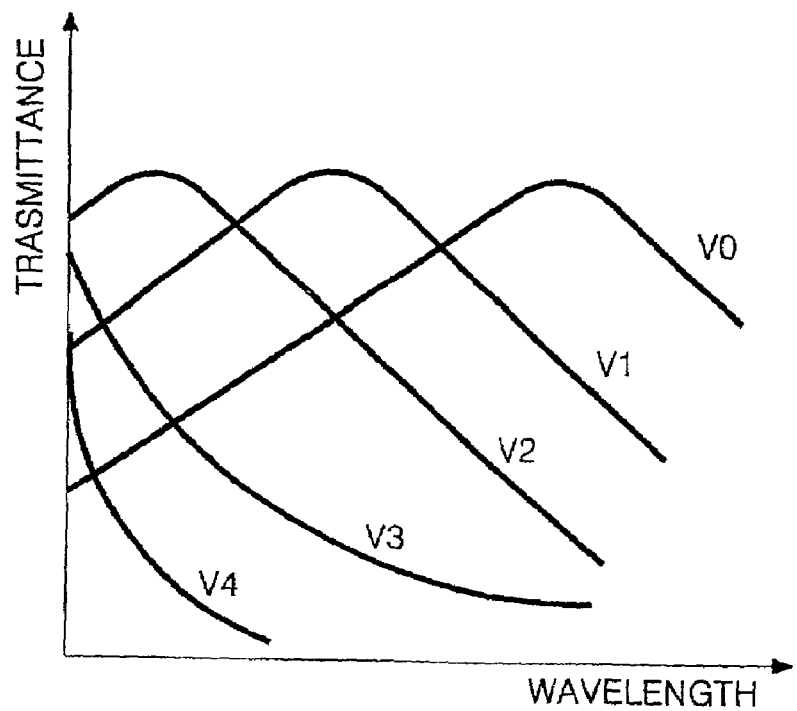
FIG. 5 is a graph showing a wavelength to transmittance characteristic according to a voltage of an ECB liquid crystal cell.

The ECB liquid crystal mode is a mode taking advantage of a complex-refraction characteristic of a liquid crystal, which changes a phase difference in accordance with a voltage application. As a result, the ECB liquid crystal mode changes a transmittance in accordance with a wavelength. A phase difference δ of the ECB liquid crystal mode can be expressed by the following equation:

$$\delta = 2\pi d \Delta n / \lambda \qquad (1)$$

wherein d represents a cell gap; Δn represents a refractive index difference; and λ represents a wavelength. FIG. 5 shows a transmittance characteristic of the ECB liquid crystal mode depending on a voltage.

The GH liquid crystal mode means that dichroic dyes are dissolved in a liquid crystal. The dichroic dyes are guest molecules of the GH mode, which has a property referred to as "guest-host interaction", that is, liable to be arranged in accordance with a director of a liquid crystal. The dichroic dyes are re-arranged in accordance with a director of a liquid crystal with the aid of an electric field applied to the liquid crystal cell owing to the guest-host interaction. The re-arranged dichroic dyes absorb more of a specific wavelength of light in accordance with a polarization direction of a light. Accordingly, the liquid crystal in the GH mode has a property modulating a wavelength of a light depending on an arrangement state of the dichroic dyes.

As a result, the multi-mode stereoscopic picture display strategy according to the embodiment of the present invention takes advantages of a liquid crystal property modulating a wavelength of a light depending on an applied voltage, to thereby display both the plane picture and the stereoscopic picture.

Referring to FIG. 6, there is shown a multi-mode stereoscopic picture display device according to a first embodiment of the present invention. The multi-mode stereoscopic picture display device includes first and second cameras 52a and 52b for photographing an object at a different angle, an image signal converter 56 for converting images inputted from the first and second cameras 52a and 52b into a stereoscopic image format to send the same to a display unit 54, a variable color barrier 58 opposed to the display screen of the display unit 54, a mode conversion controller 50 connected to the display unit 54 and a user interface (not shown), and first and second switches 60a and 60b for applying different voltages V0, V1 and V2 to the variable color barrier 58 depending on whether there is a plane mode or a stereoscopic mode under control of the mode conversion controller 50.

The image signal converter 56 mixes a video signal received from the first camera 52a with a video signal received from the second camera 52b, and sends the mixed signal to the display unit 54.

The display unit 54 displays the mixed image signal inputted from the image signal converter 56. Each of the first and second pixels P1 and P2 of the display unit 54 includes red, green and blue sub-pixel cells. A red video signal r1 from the first camera 52a and green and blue video signals g2 and b2 from the second camera 52b are displayed on the first pixel P1 of the display unit 54. On the other hand, a red video signal r2 from the second camera 52b and green and blue video signals g1 and b1 from the first camera 52a are displayed on the second pixel P2 of the display unit 54. The display unit 54 can be implemented with a self-emitting device such as a cathode ray tube (CRT), an electro-luminescence (EL) device or a plasma display panel (PDP). Alternatively, the display unit 54 may be implemented with a passively emitting device such as a liquid crystal display (LCD) requiring a backlight.

The variable color barrier 58 includes first variable filters 58L1 and 58R1 and second variable filters 58L2 and 58R2 that are alternated with each other. The first and second variable filters 58L1, 58R1, 58L2 and 58R2 are supplied with different voltages depending on a plane mode or a stereoscopic mode. In the plane mode, the first and second variable filters 58L1, 58R1, 58L2 and 58R2 transmit all wavelength bands of lights inputted from the first and second pixels P1 and P2 of the display unit 54 toward an observer. In the stereoscopic mode, the first variable filters 58L1 and 58R1 transmit only red lights r1 and r2 inputted from the first and second pixels P1 and P2 toward an observer while shutting off light with other wavelength bands. In other words, the first variable filters 58L1 and 58R1 serve as red filters in the stereoscopic mode. On the other hand, the second variable filters 58L2 and 58R2 transmit green light g1 and g2 and blue light b1 and b2 inputted from the first and second pixels P1 and P2 toward an observer in the stereoscopic mode. In other words, the second variable filters 58L2 and 58R2 serve as a cyan filter in the stereoscopic mode. A distance between the display unit 54 and the variable color barrier 58 and the sizes of variable filters 58L1, 58R1, 58L2 and 58R2 is appropriately established in consideration of a distance between an observer and the variable color barrier 58 such that a red light r1 from the first pixel P1 and a green light g1 and a blue light b1 from the second pixel P2 are incident to the left-eye EL of an observer while a red light r2 from the second pixel P2 and a green light g2 and a blue light b2 from the first pixel P1 are incident to the right-eye ER of an observer. Accordingly, an observer recognizes an image photographed by the first camera 52a through his left-eye EL and an image photographed by the second camera 52b through his right-eye ER, so that he can view an object in a stereoscopic manner.

As a result, in the variable color barrier 58, all the filter areas serve as transparent windows in the plane mode while two alternate and adjacent filter areas serve as complementary color filters for transmitting lights having a mutually complementary color relationship in the stereoscopic mode. The first and second variable filters 58L1, 58R1, 58L2 and 58R2 of the variable color barrier 58 consist of variable filters changed into a red filter and a cyan filter, but they may consist of a green filter and a magenta filter, or a blue filter or a yellow filter.

Figure 7A:
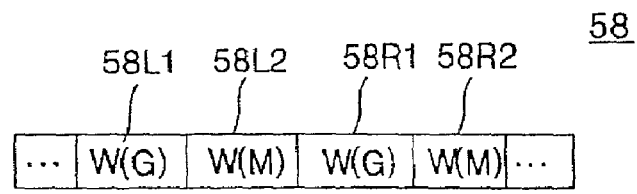
FIG. 7A and FIG. 7B illustrates another embodiments of the variable color barrier shown in FIG. 6.
Figure 7B:
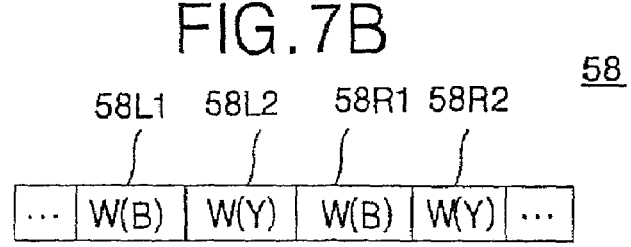

FIG. 7A is an example wherein the first and second variable filters 58L1, 58R1, 58L2 and 58R2 consist of a green filter G and a magenta filter M, whereas FIG. 7B represents a case where the first and second variable filters 58L1, 58R1, 58L2 and 58R2 consist of a blue filter B and a yellow filter Y. A detailed description as to an operation for each mode of the variable color barrier 58 will be made later in conjunction with FIG. 8A and FIG. 8B.

The mode conversion controller 50 is connected to a user interface such as a remote controller or an on-screen display to control the first and second switches 60a and 60b in accordance with a mode conversion command inputted from a user or a picture information inputted from the display unit 54.

The first switch 60a includes a reference contact connected to the first variable color filters 58L1 and 58R1 of the variable color barrier 58, and two selection contacts connected to a plane mode voltage source V0 and a first stereoscopic mode voltage source V1. In the plane mode, the first switch 60a applies a plane mode voltage V0 to the first variable color filters 58L1 and 58R1 of the variable color barrier 58 under control of the mode conversion controller 50. In the stereoscopic mode, the first switch 60a applies a first stereoscopic mode voltage V1 to the first variable color filters 58L1 and 58R1 of the variable color barrier 58 under control of the mode conversion controller 50.

The second switch 60b includes a reference contact connected to the second variable color filters 58L2 and 58R2 of the variable color barrier 58, and two selection contacts connected to a plane mode voltage source V0 and a second stereoscopic mode voltage source V2. In the plane mode, the second switch 60b applies a plane mode voltage V0 to the second variable color filters 58L2 and 58R2 of the variable color barrier 58 under control of the mode conversion controller 50 in a manner similar to the first switch 60a. In the stereoscopic mode, the second switch 60b applies a second stereoscopic mode voltage V2 to the second variable color filters 58L2 and 58R2 of the variable color barrier 58 under control of the mode conversion controller 50.

Figure 8A:
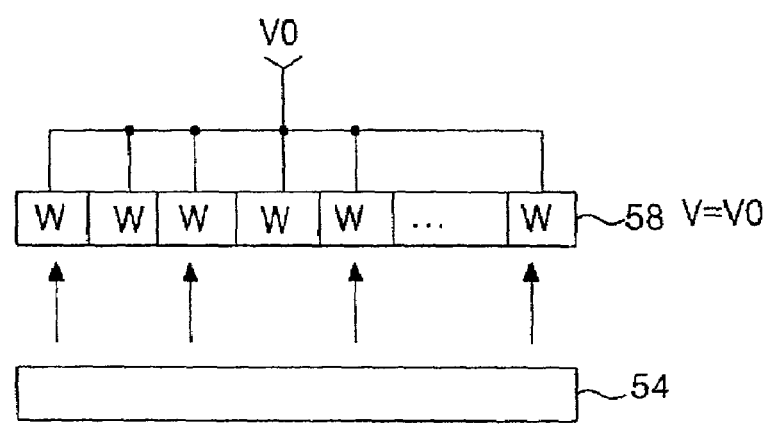
FIG. 8A depicts a plane mode operation of the multi-mode stereoscopic picture display device shown in FIG. 6.

Referring to FIG. 8A, in the plane mode, a plane mode voltage V0 is applied to the first and second variable filters 58L1, 58R1, 58L2 and 58R2 of the variable color barrier 58. Then, light emitted from the first and second pixels P1 and P2 of the display unit 54 is progressed to an observer "as is" without being separated into the left-eye EL and the right-eye ER of an observer. Accordingly, images photographed by the first and second cameras 52a and 52b are incident to the left-eye EL and the right-eye ER of an observer in a mixed state in the plane mode, so that an observer recognizes a picture displayed on the display unit 54 as a plane picture. Herein, a plane mode voltage V0 can be set to a voltage for allowing the liquid crystal cell to transmit white light as shown in FIG. 4, i.e., 2.2V. The plane mode voltage V0 may have a different voltage level depending on a type of liquid crystal.

Figure 8B:
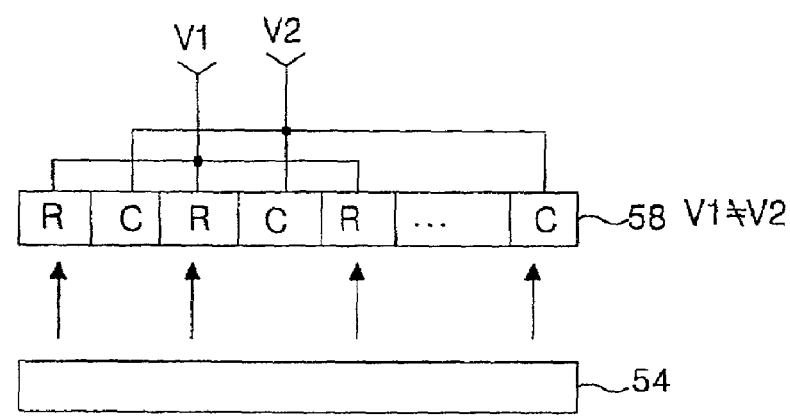
FIG. 8B depicts a stereoscopic mode operation of the multi-mode stereoscopic picture display device shown in FIG. 6.

Referring to FIG. 8B, in the stereoscopic mode, a first stereoscopic mode voltage V1 is applied to the first variable filters 58L1 and 58R1 of the variable color barrier 58 by a switching of the first switch 60a. At the same time, in the stereoscopic mode, a second stereoscopic mode voltage V2 is applied to the second variable filters 58L2 and 58R2 of the variable color barrier 58 by a switching of the second switch 60b. Herein, the first stereoscopic mode voltage V1 can be set to a voltage for allowing the liquid crystal cell to transmit red light as shown in FIG. 4, i.e., 2.35V. The second stereoscopic mode voltage V2 can be set to a voltage for allowing the liquid crystal cell to transmit cyan light as shown in FIG. 4, i.e., a voltage between 2.28V and 2.32V. The first and second stereoscopic mode voltages V1 and V2 have different voltage levels depending on a type of liquid crystal. Accordingly, the first and second variable filters 58L1, 58R1, 58L2 and 58R2 of the variable color barrier 58 respond to the stereoscopic mode voltages V1 and V2, thereby separating light emitted from the first and second pixels P1 and P2 into the left-eye EL and the right-eye ER of an observer such that an image photographed by the first camera 52a is incident to the left-eye EL of an observer and an image photographed by the second camera 52b is incident to the right-eye ER of an observer. In other words, in the stereoscopic mode, the left filter 58L1 of the first variable filters opposite the first pixel P1 of the display unit 54 transmits a red light r1 from the first pixel P1 toward the left-eye EL of an observer while shutting off light having other wavelength bands. The right filter 58R1 of the first variable filters opposite the second pixel P2 of the display unit 54 transmits red light r2 from the second pixel P2 toward the right-eye ER of an observer while shutting off light having other wavelength bands. Further, the left filter 58L2 of the second variable filters transmits green right g1 and blue light b1 from the second pixel P2 toward the left-eye EL of an observer while shutting off red light r1 from the first pixel P1. The right filter 58R2 of the second variable filters transmits green right g2 and blue light b2 from the first pixel P1 toward the right-eye ER of an observer while shutting off red light r2 from the second pixel P2. Accordingly, an observer simultaneously views an object at a different angle through his left-eye EL and his right-eye ER in the stereoscopic mode, so that he recognizes a picture displayed on the display unit 54 as a stereoscopic picture. In other words, the left-eye EL of an observer views an object at an angle of the first camera 52a while the right-eye ER of an observer views an object at an angle of the second camera 52b.

Figure 9:
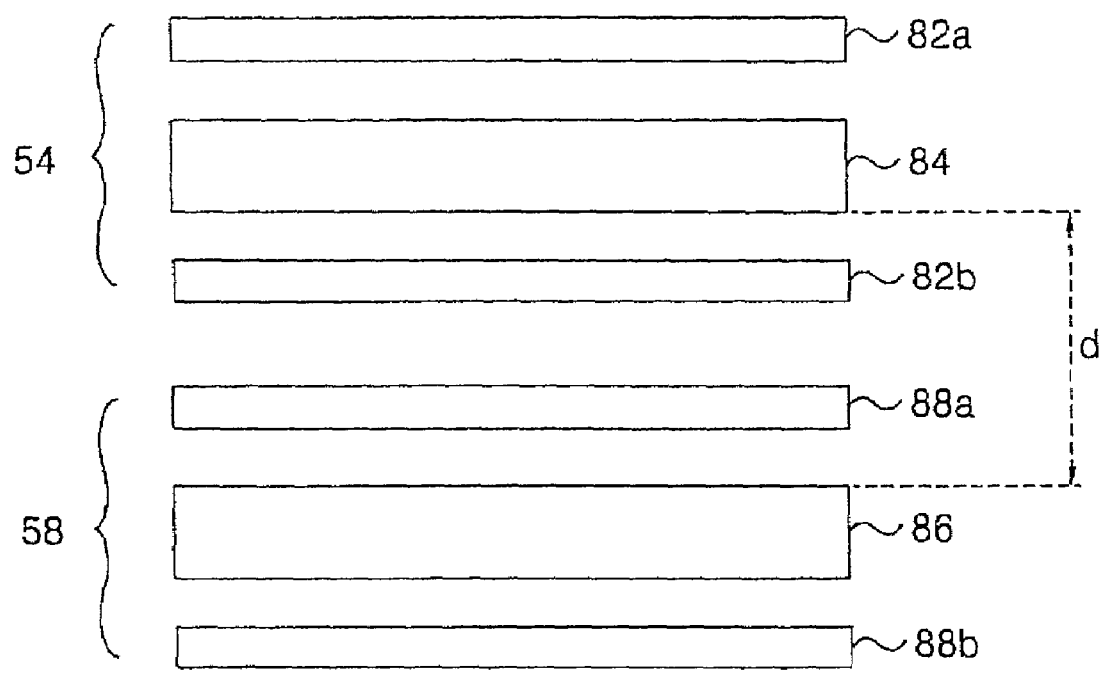
FIG. 9 is a detailed section view of the variable color barrier and the display unit shown in FIG. 6.

FIG. 9 illustrates detailed structures of the variable color barrier 58 and the display unit 54.

Referring now to FIG. 9, the variable color barrier 58 and the display unit 54 include liquid crystal display panels 86 and 84, respectively, having a liquid crystal injected between two glass substrates, each of which are provided with an electrode for applying a voltage signal to the liquid crystal. A liquid crystal having a different transmission wavelength band depending on an applied voltage, for example, an ECB mode or GH mode liquid crystal, is injected into the liquid crystal display panel 86 of the variable color barrier 58. The liquid crystal display panel 86 of the variable color barrier 58 and the liquid crystal display panel 84 of the display unit 54 have polarizers 82a and 82b; 88a and 88b are attached to the front side and the rear side thereof, respectively. The liquid crystal display panel 86 of the variable color barrier 58 and the liquid crystal display panel 84 of the display unit 54 are spaced by an appropriate distance d from each other so that an observer can separately view left-eye and right-eye picture information. Further, the polarizers 82b and 88a in which the variable color barrier 58 is opposite to the display unit 54 may be shared by a single polarizer depending upon a design of the polarizer 88b of the variable color barrier 58, the liquid crystal display panel 86, the polarizer 82a of the display unit 54 and the liquid crystal display panel 84.

Figure 10:
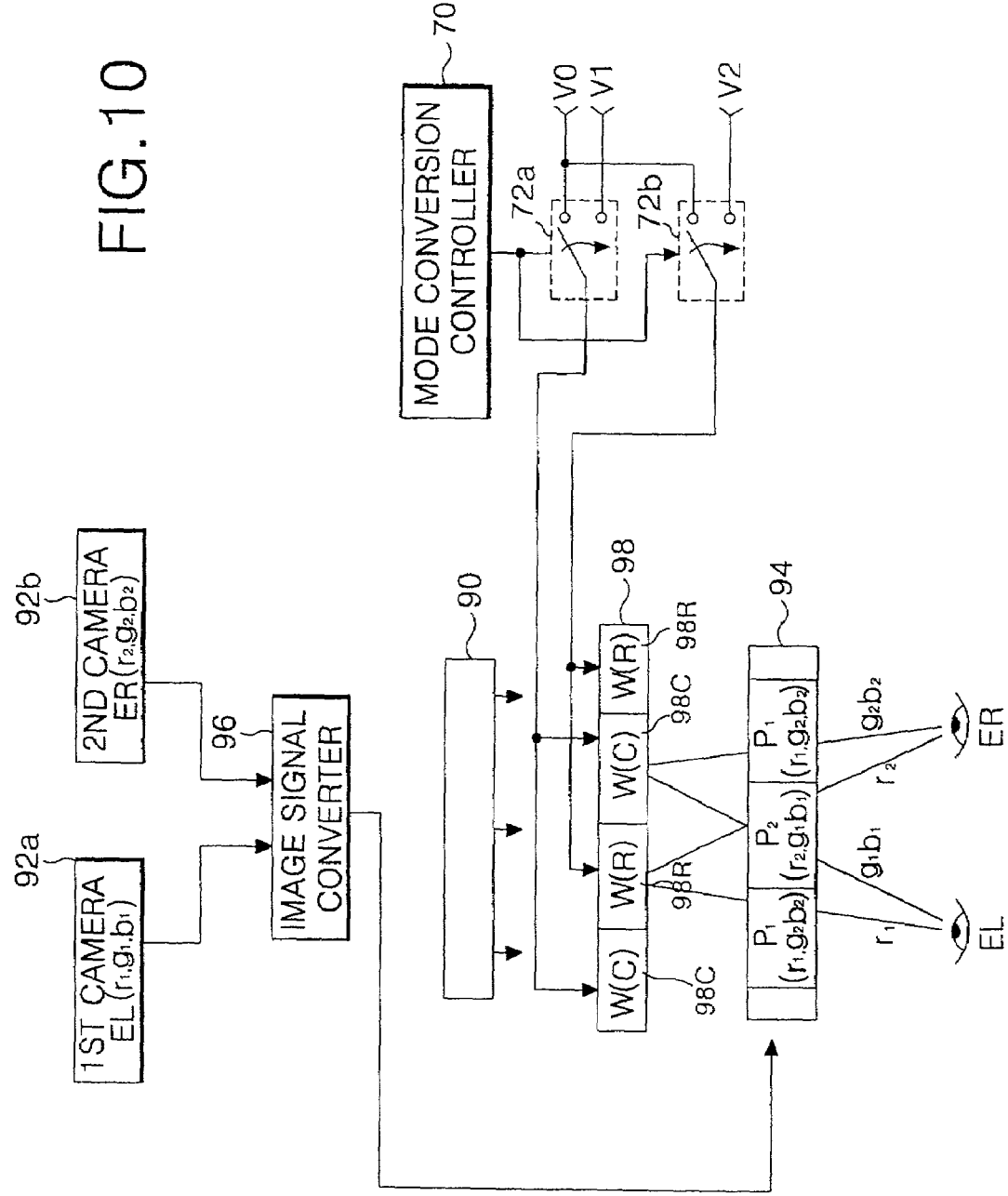
FIG. 10 is a schematic block diagram showing the configuration of a multi-mode stereoscopic image display device according to a second embodiment of the present invention.

Referring to FIG. 10, there is shown a multi-mode stereoscopic picture display device according to a second embodiment of the present invention. The multi-mode stereoscopic picture display device includes first and second cameras 92a and 92b for photographing an object at different angles, a variable color barrier 98 for modulating a wavelength of a light inputted from a backlight unit 90 in accordance with an applied voltage, a display unit 94 using of light received from the variable color barrier 98 to display a picture, an image signal converter 96 for converting images inputted from the first and second cameras 92a and 92b to a display unit 94, a mode conversion controller 70 connected to the display unit 94 and a user interface (not shown), and first and second switches 720a and 72b for applying different voltages V0, V1 and V2 to the variable color barrier 98 depending on a plane mode or a stereoscopic mode under control of the mode conversion controller 70.

The variable color barrier 98 includes first variable filters 98R and second variable filters 98C that are alternated with each other. The first and second variable filters 98R and 98C are supplied with different voltages depending on a plane mode or a stereoscopic mode. In the plane mode, the first and second variable filters 98R and 98C transmit all wavelength bands of lights inputted from the backlight unit 90 toward an observer. In the stereoscopic mode, the first variable filters 98R transmit only a red wavelength band of light from a white light inputted from the backlight unit 90 toward an observer while shutting off lights other wavelength bands. On the other hand, the second variable filters 98C transmit light with green and blue wavelength bands, that is, a cyan light from a white light inputted from the backlight unit 90 in the stereoscopic mode.

A distance between the display unit 94 and the variable color barrier 98 is appropriately established in consideration of a distance between an observer and the variable color barrier 58 such that a red light r1 from the first pixel P1 and a green light g1 and a blue light b1 from the second pixel P2 are incident to the left-eye EL of an observer while a red light r2 from the second pixel P2 and a green light g2 and a blue light b2 from the first pixel P1 are incident to the right-eye ER of an observer. Accordingly, an observer recognizes an image photographed by the first camera 52a through his left-eye EL and an image photographed by the second camera 52b through his right-eye ER, so that he can view an object in a stereoscopic manner.

The first and second variable filters 98R and 98C of the variable color barrier 98 may consist of filters having a mutual complementary color relation other than the red filter and the cyan filter, for example, a green filter and a magenta filter, or a blue filter and a yellow filter.

The image signal converter 96 mixes a video signal received from the first camera 92a with a video signal received from the second camera 92b, and sends the mixed signal to the display unit 94.

The display unit 94 displays the mixed image signal inputted from the image signal converter 96. Each of the first and second pixels P1 and P2 of the display unit 94 includes red, green and blue sub-pixel cells. A red video signal r1 from the first camera 92a and green and blue video signals g2 and b2 from the second camera 92b are displayed on the first pixel P1 of the display unit 94. On the other hand, a red video signal r2 from the second camera 92b and green and blue video signals g1 and b1 from the first camera 92a are displayed on the second pixel P2 of the display unit 94. The display unit 94 can be implemented with a transmission-type display device such as a transmission-type liquid crystal display.

The mode conversion controller 70 is connected to a user interface such as a remote controller or an on-screen display to control the first and second switches 72a and 72b in accordance with a mode conversion command inputted from a user or a picture information inputted from the display unit 94.

The first switch 72a includes a reference contact connected to the first variable color filters 98R of the variable color barrier 98, and two selection contacts connected to a plane mode voltage source V0 and a first stereoscopic mode voltage source V1. In the plane mode, the first switch 72a applies a plane mode voltage V0 to the first variable color filters 98R of the variable color barrier 98 under control of the mode conversion controller 70. In the stereoscopic mode, the first switch 72a applies a first stereoscopic mode voltage V1 to the first variable color filters 98R of the variable color barrier 98 under control of the mode conversion controller 70.

The second switch 72b includes a reference contact connected to the second variable color filters 98C of the variable color barrier 98, and two selection contacts connected to a plane mode voltage source V0 and a second stereoscopic mode voltage source V2. In the plane mode, the second switch 72b applies a plane mode voltage V0 to the second variable color filters 98C of the variable color barrier 98 under control of the mode conversion controller 70 in a manner similar to the first switch 72a. In the stereoscopic mode, the second switch 72b applies a second stereoscopic mode voltage V2 to the second variable color filters 98C of the variable color barrier 98 under control of the mode conversion controller 70.

Figure 11A:
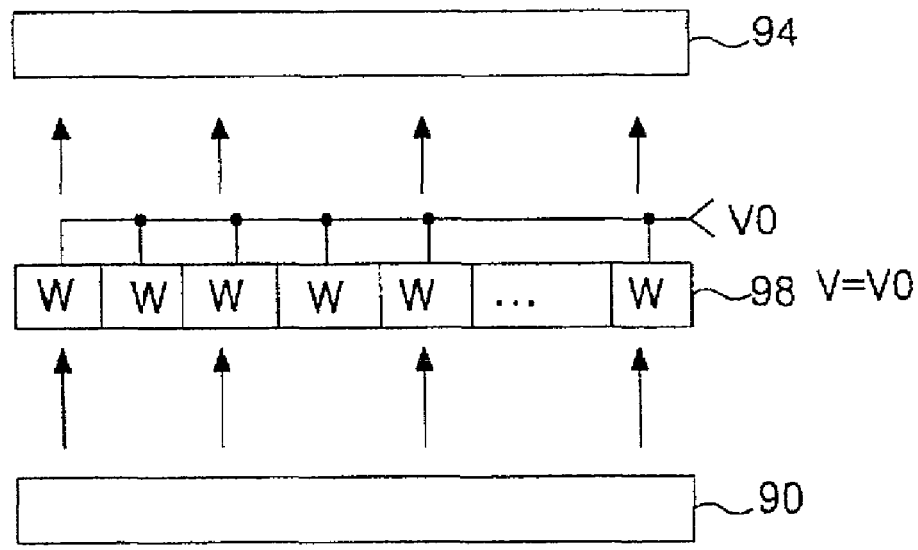
FIG. 11A depicts a plane mode operation of the multi-mode stereoscopic picture display device shown in FIG. 10.
Figure 11B:
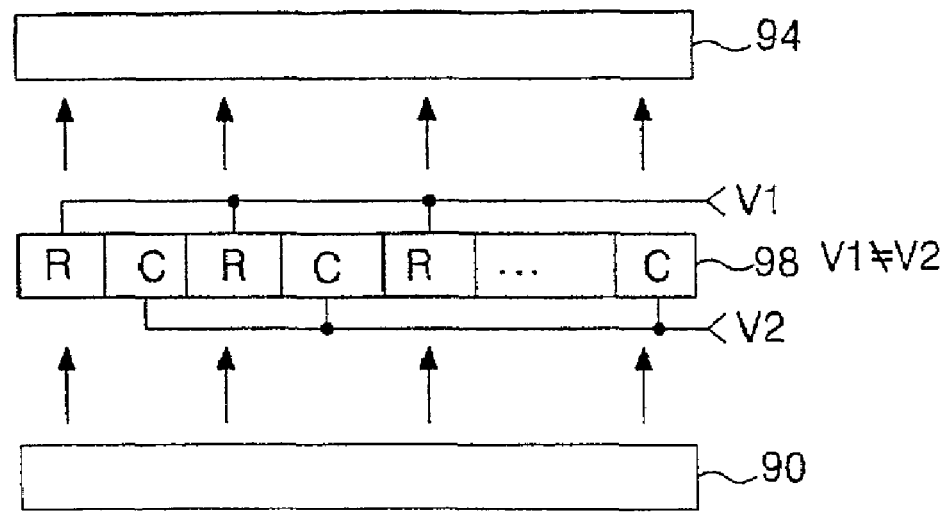
FIG. 11B depicts a stereoscopic mode operation of the multi-mode stereoscopic picture display device shown in FIG. 10.

FIG. 11A represents a plane mode of the multi-mode stereoscopic picture display device according to the second embodiment of the present invention, and FIG. 11B represents a stereoscopic mode of the multi-mode stereoscopic picture display device according to the second embodiment of the present invention.

Referring to FIG. 11A and FIG. 11B, when the backlight unit 90 of the multi-mode stereoscopic picture display device is turned on, it generates a white light, irrespective of a plane mode or a stereoscopic mode. The backlight unit 90 includes a cold cathode lamp, a reflective mirror for generating a white light in the shape of a linear light source, a light guide for converting a light inputted from the cold cathode lamp and the reflective mirror into the shape of a surface light source, and optical sheets, such as a prism sheet and a diffusion sheet, etc., provided at the light guide to provide uniform light efficiency and light distribution. The backlight unit 90 may consist of a plurality of light emitting diodes (LED's) arranged in the shape of a surface emission.

The variable color barrier 98 is supplied with a plane mode voltage V0 in the plane mode while it is supplied with first and second stereoscopic mode voltages V1 and V2, selectively applied to each adjacent filter thereof in the stereoscopic mode.

In the plane mode, the variable color barrier 98 transmits white light from the backlight unit 90 (as it is) toward the display unit as shown in FIG. 11A. In the stereoscopic mode, the variable color barrier 98 responds to each of the first and second stereoscopic mode voltages V1 and V2 to thereby convert a white light inputted from the backlight unit 98 into lights having a mutual complementary color relationship, for example, a red light R and a cyan light C via each of adjacent variable filters. These converted lights are incident to the display unit 94.

In the plane mode, the display unit 94 uses white light inputted via the variable color barrier 98 to display a picture, thereby displaying a plane picture. On the other hand, in the stereoscopic mode, a red video signal r1 from the first camera 92a and green and blue video signals g2 and b2 from the second camera 92b are applied to any one of two adjacent pixels of the display unit 94 while a red video signal r2 from the second camera 92b and green and blue video signals g1 and b1 from the first camera 92a is applied to the other one, as can be seen from FIG. 10 and FIG. 11B. When the video signals are being applied to the display unit 94, lights having a mutual complementary color relationship are incident, via the variable color barrier 98, to the two adjacent pixels of the display unit 94 as shown in FIG. 10. Further, a left-eye picture and a right-eye picture displayed on the two adjacent pixels of the display unit 94 are incident to the left-eye EL and the right-eye ER of an observer. Accordingly, an observer simultaneously views the left-eye picture and the right-eye picture photographed at different angles and displayed on the adjacent pixels, so that he recognizes a picture displayed on the display unit 94 as a stereoscopic picture.

Figure 12:
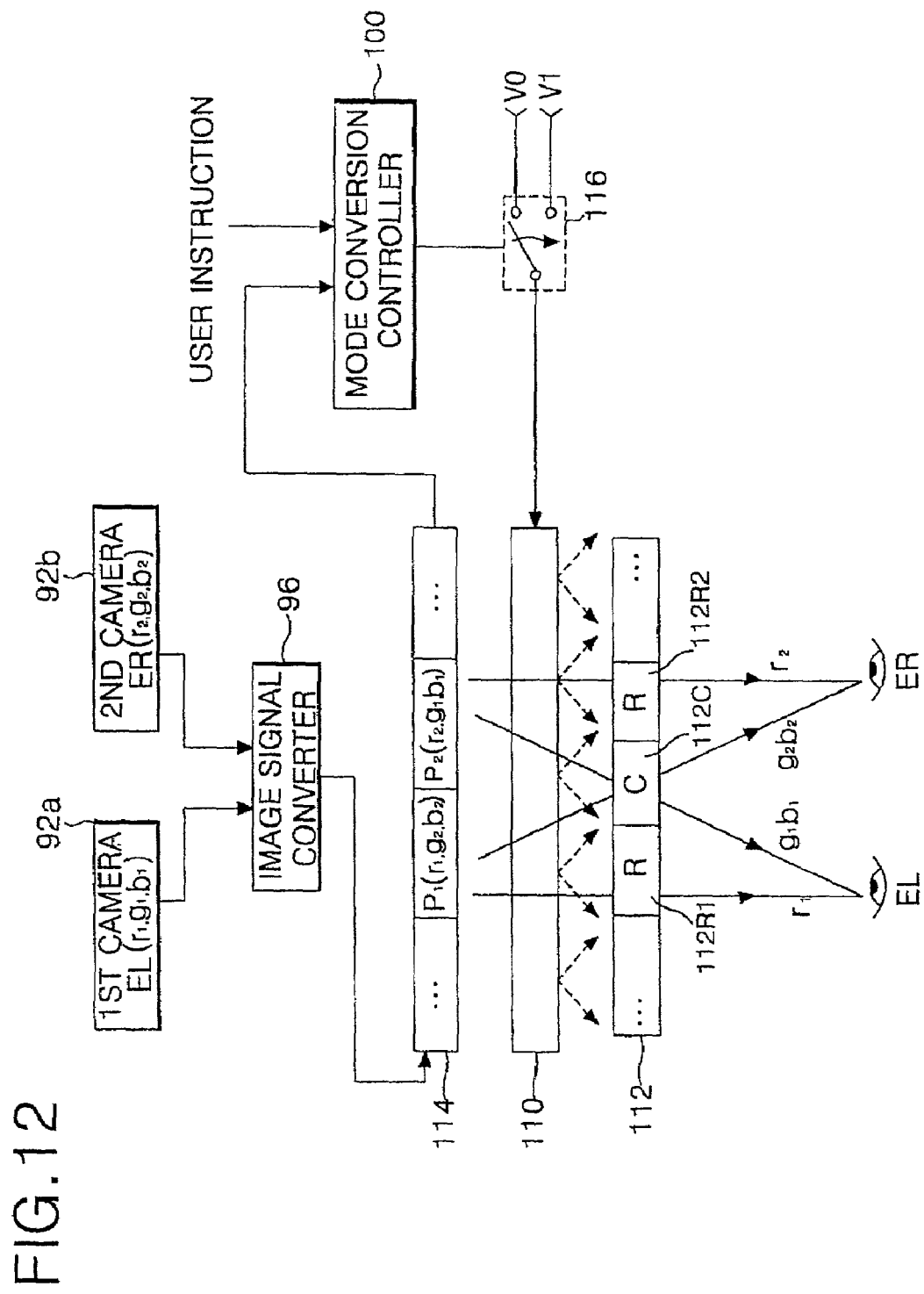
FIG. 12 is a schematic block diagram showing the configuration of a multi-mode stereoscopic image display device according to a third embodiment of the present invention.

FIG. 12 shows a multi-mode stereoscopic picture display device according to a third embodiment of the present invention. In FIG. 12, elements being substantially identical to those of the multi-mode stereoscopic picture display device shown in FIG. 6 are given by the same reference numerals, and a detailed description of these elements will be omitted.

Referring to FIG. 12, the multi-mode stereoscopic picture display device includes a display unit 114 for displaying an image signal, a variable light-scattering device 110 for transmitting or scattering light inputted from the display unit 114, a color barrier 112 for discriminating a wavelength of a light inputted from the variable light-scattering device 110, a mode conversion controller 100 and a switch 116 for controlling the variable light-scattering device 110 for each mode.

Signals obtained from two cameras 92a and 92b having photographed an object at different angles are inputted to two adjacent pixels of the display unit 114 and mixed by the image signal converter 96. The display unit 114 can be implemented with a self-emitting device or a passively emitting device.

The variable light-scattering device 110 changes a scattering characteristic of light inputted from the display unit 114 in accordance with an applied voltage level. It is desirable that the variable light-scattering device 110 consist of a polymer dispersed liquid crystal (PDLC) display device capable of changing a scattering characteristic of a light beam in accordance with an applied voltage.

The PDLC includes a solid-state polymer medium and a liquid crystal material isolated in a droplet shape within the medium. A director of the liquid crystal droplet has an arrangement changed in accordance with an applied voltage. The solid-state polymer is usually selected such that its refractive index is similar to a normal refractive index $n_o$ of a liquid crystal. In this case, if an electric field the liquid crystal droplet is placed in, then each liquid crystal droplet assumes a random arrangement state, and causes a large refractive index difference between the liquid crystal isolated within the liquid crystal droplet and the polymer medium. Then, a light being incident to the surface of the liquid crystal droplet is scattered. Otherwise, each liquid crystal droplet assumes an arrangement state parallel to the electric field to have a refractive index almost similar to the refractive indices of the liquid crystal and the polymer medium. Accordingly, if an electric field is applied to the liquid crystal droplet, then a light incident to the surface of the liquid crystal droplet is transmitted as it is.

The color barrier 112 includes red filters 112R1 and 112R2 and a cyan filter 112C that are alternated with each other.

The mode conversion controller 100 is connected to a user interface such as a remote controller or an on-screen display to control the switch 116 in accordance with a mode conversion command inputted from a user or picture information inputted from the display unit 114.

The switch 116 includes a reference contact connected to the variable light-scattering device 110, and two selection contacts connected to a plane mode voltage source V0 and a first stereoscopic mode voltage source V1. Under control of the mode conversion controller 100, the switch 116 applies a plane mode voltage V0 to the variable light-scattering device 110 in the plane mode while applying a stereoscopic mode voltage V1 to the variable light-scattering device 110 in the stereoscopic mode.

In the plane mode, a plane mode voltage V0 is applied to the variable light-scattering device 110. Then, a light being incident, from the display unit 114, to the variable light-scattering device 110 is scattered as indicated by a dotted arrow, and thereafter is incident to the color barrier 112. As a result, a light having passed the color barrier 112 is scattered without being separated into a left-eye picture and a right-eye picture, so that an observer recognizes a picture displayed on the display unit 114 as a plane picture.

In the stereoscopic mode, a stereoscopic mode voltage V1 is applied to the variable light-scattering device 110. Then, a light being incident from the display unit 114 to the variable light-scattering device 110, transmits the variable light-scattering device 110 as indicated by a solid line arrow. At this time, the first red filter 112R1 of the color barrier 112 transmits a red light r1 inputted from the first pixel P1 of the display unit 114 toward the left-eye EL of an observer while shutting off lights with other wavelength bands. The second red filter 112R2 being adjacent to the right side of the first red filter 112R1 transmits a red light r2 inputted from the second pixel P2 of the display unit 114 toward the right-eye ER of an observer while shutting off light with other wavelength bands. The cyan filter 112C arranged between the first and second red filters 112R1 and 112R2 of the color barrier 112 shuts off a red light, and transmits green and blue lights g2 and b2 inputted from the first pixel P1 toward the right-eye ER of an observer while transmitting green and blue lights g1 and b1 inputted from the second pixel P2 toward the left-eye EL of an observer. As a result, an observer simultaneously views an image photographed by the first camera 92a through his left-eye EL and an image photographed by the second camera 92b through his right-eye ER, so that he recognizes a picture displayed on the display unit 114 as a stereoscopic picture.

FIG. 13 shows a multi-mode stereoscopic picture display device according to a fourth embodiment of the present invention. In FIG. 13, elements being substantially identical to those of the multi-mode stereoscopic picture display device shown in FIG. 6 are given by the same reference numerals, and a detailed description as to these elements will be omitted.

Referring to FIG. 13, the multi-mode stereoscopic picture display device includes a backlight unit 127 for generating a white light W, a color barrier 123 for receiving the white light W from the backlight unit 127, a display unit 125 for displaying an image signal, a variable light-scattering device 121 provided between the color barrier 123 and the display unit 125, and a mode conversion controller 122 and a switch 124 for controlling the variable light-scattering device 121 for each mode.

The color barrier 123 includes red filters 123R1 and 123R2 and a cyan filter 123C that are alternated with each other.

A white light W from the backlight unit 127 is incident to the color barrier 123. The first red filter 123R1 of the color barrier 123 transmits a red light inputted from the backlight unit 127 toward the variable light-scattering device 121 while shutting off lights with other wavelength bands. The cyan filter 123C alternated with the color barrier 123 shuts off only a red light while transmitting green and blue lights inputted from the backlight unit 127 toward the variable light-scattering device 121.

The variable light-scattering device 121 transmits a light inputted from the color barrier 123 without change in the stereoscopic mode while scattering a light inputted from the color barrier 123 in the plane mode.

Signals obtained from two cameras 92a and 92b having photographed an object at different angles are inputted to two adjacent pixels of the display unit 125 with being mixed by the image signal converter 96.

The mode conversion controller 122 controls the switch 124 in accordance with a mode conversion command inputted from a user or picture information inputted from the display unit 125, or in accordance with a user instruction.

The switch 124 includes a reference contact connected to the variable light-scattering device 121, and two selection contacts connected to a plane mode voltage source V0 and a first stereoscopic mode voltage source V1. Under control of the mode conversion controller 122, the switch 124 applies a plane mode voltage V0 to the variable light-scattering device 121 in the plane mode while applying a stereoscopic mode voltage V1 to the variable light-scattering device 121 in the stereoscopic mode.

In the plane mode, a plane mode voltage V0 is applied to the variable light-scattering device 121. Then, a light having transmitting the variable light-scattering device 121 is scattered as indicated by a dotted arrow and thereafter is incident to the display unit 125. As a result, a light having reached the display unit 125 is scattered without being separated into a left-eye picture and a right-eye picture, so that an observer recognizes a picture displayed on the display unit 114 as a plane picture.

In the stereoscopic mode, a stereoscopic mode voltage V1 is applied to the variable light-scattering device 121. Then, a light having transmitted the variable light-scattering device 121 is progressed as indicated by a solid line arrow to be incident to the display unit 125. As a result, an observer simultaneously views an image photographed by the first camera 92a through his left-eye EL and an image photographed by the second camera 92b through his right-eye ER, so that he recognizes a picture displayed on the display unit 114 as a stereoscopic picture.

As described above, the multi-mode stereoscopic picture display device according to the present invention can display the plane picture and the stereoscopic picture depending upon a type of picture or a user's selection.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. For instance, it should be understood that a stereoscopic image and a plane picture could be simultaneously displayed within a single field without modifying a configuration of the multi-mode stereoscopic picture display device according to the present invention.

Accordingly, the scope of the invention shall be determined only by the appended claims and their equivalents.

What is claimed is:

1. A method of displaying a multi-mode stereoscopic image, comprising the steps of:
aligning a display unit with a variable color barrier, the display unit having first pixels and second pixels displaying mixed image signals, each of the first pixels having at least one sub-pixel cell coded with a first color used for creating a left-eye picture and at least one other sub-pixel cell each coded with a color different from the first color and used for creating a right-eye picture and each of the second pixels having at least one sub-pixel cell coded with the first color used for creating the right-eye picture and at least one other sub-pixel cell each coded with the color different from the first color and used for creating the left-eye picture, the variable color barrier unit having first and second variable filters adjacent to and alternated with each other, wherein each of said first and second variable filters is overlapped with a portion of said first pixels and a portion of said second pixels such that all sub-pixel cells of each of the first pixels are aligned to a left-eye of an observer through at least one first variable filter and aligned to a right-eye of the observer through at least one second variable filter and all sub-pixel cells of each of the second pixels are aligned to the right-eye of the observer through at least one first variable filter and aligned to the left-eye of the observer through at least one second variable filter;
displaying video signals obtained by photographing an object at different angles on the display unit;
generating a mode signal for selecting between a stereoscopic mode and a plane mode;
applying a first voltage to the first variable filters such that the first variable filters transmit a light of the first color while shutting off light of other colors and simultaneously applying a second voltage different from the first voltage to the second variable filters such that the second variable filters transmit the light of said other colors while shutting off the light of said first color when said stereoscopic mode is selected; and
applying a third voltage different from both the first and second voltages to both of said first and second variable filters such that both the first and second variable filters transmit light of all colors when said plane mode is selected.

2. The method of displaying a multi-mode stereoscopic image according to claim 1, wherein each of said first and second variable filters is overlapped with a half portion of said first pixels and a half portion of said second pixels.

3. The method of displaying a multi-mode stereoscopic image according to claim 1, wherein said first and second variable filters behave as complementary color filters when in said stereoscopic mode.

4. The method of displaying a multi-mode stereoscopic image according to claim 1, wherein all of the first and second variable filters simultaneously operate to transmit the light of the first color and the light of the color other than the first color, respectively.

5. A multi-mode stereoscopic image displaying apparatus, comprising:
an image signal converter for combining video signals obtained by photographing an object at different angles, and for creating mixed image signals;
a display device having first pixels and second pixels for displaying the mixed image signals received from the image signal converter, each of the first pixels having at least one sub-pixel cell coded with a first color used for creating a left-eye picture and at least one other sub-pixel cell each coded with a color different from the first color and used for creating a right-eye picture and each of the second pixels having at least one sub-pixel cell coded with the first color used for creating the right-eye picture and at least one other sub-pixel cell each coded with the color different from the first color and used for creating left-eye picture;
a variable color barrier unit having first and second variable filters adjacent to and alternated with each other, wherein each of said first and second variable filters is overlapped with a portion of said first pixels and a portion of said second pixels such that all sub-pixel cells of each of the first pixels are aligned to a left-eye of an observer through at least one first variable filter and aligned to a right-eye of the observer through at least one second variable filter and all sub-pixel cells of each of the second pixels are aligned to the right-eye of the observer through at least one first variable filter and aligned to the left-eye of the observer through at least one second variable filter; and
a mode conversion controller for generating a mode signal for selecting between a stereoscopic mode and a plane mode;
a voltage source for generating first, second and third voltages each voltage being different the other voltages; and
a switch connected between said variable color barrier unit and said voltage source to apply said first voltage to the first variable filters such that the first variable filters transmit a light of the first color while shutting off light of other colors and to simultaneously apply said second voltage to said second variable filters such that the second variable filters transmit light of said other colors while shutting off light of said first color when said switch is in the stereoscopic mode, and to apply said third voltage to said both of said first and second variable filters of said variable color barrier unit such that both the first and second variable filters transmit light of all colors when said switch is in the plane mode.

6. The multi-mode stereoscopic image display apparatus according to claim 5, wherein the variable color barrier unit is arranged at a front side of the display device.

7. The multi-mode stereoscopic image display apparatus according to claim 5, wherein the variable color barrier unit is arranged at a rear side of the display device.

8. The multi-mode stereoscopic image display apparatus according to claim 5, wherein the variable color barrier unit is a liquid crystal display panel adopting any one of an electrically controlled birefringence (ECB) mode and a guest-host (GH) mode.

9. The multi-mode stereoscopic image display apparatus according to claim 5, wherein the mode conversion controller receives a user instruction to select between the stereoscopic mode and the plane.

10. The multi-mode stereoscopic image displaying apparatus according to claim 5, wherein each of said first and second variable filters is overlapped with a half portion of said first pixels and a half portion of said second pixels.

11. The multi-mode stereoscopic image displaying apparatus according to claim 5, wherein said first and second variable filters behave as complementary color filters when in said stereoscopic mode.

12. The multi-mode stereoscopic image displaying apparatus according to claim 5, wherein all of the first and second variable filters simultaneously operate to transmit the light of the first color and the light of the color other than the first color, respectively.

13. The multi-mode stereoscopic image displaying apparatus according to claim 5, wherein the display device comprises:
a liquid crystal panel configured to generate the first and second pixels information;
a first polarizer attached to a surface of the liquid crystal panel of the display device away from the variable color barrier; and
a second polarizer attached to a surface of the liquid crystal panel of the display device towards the variable color barrier.

14. The multi-mode stereoscopic image displaying apparatus according to claim 5, wherein the variable color barrier comprises:
a liquid crystal panel with a plurality of liquid crystal cells, wherein each liquid crystal cell behaves as either the first variable filter or the second variable filter;
a first polarizer attached to a surface of the liquid crystal panel of the variable color barrier towards the display device; and
a second polarizer attached to a surface of the liquid crystal panel of the variable color barrier away from the display device.

15. The multi-mode stereoscopic image displaying apparatus according to claim 5, wherein the display device comprises:
a liquid crystal panel configured to generate the first and second pixels information,
a first polarizer attached to a surface of the liquid crystal panel of the display device away from the variable color barrier, and
a second polarizer attached to a surface of the liquid crystal panel of the display device towards the variable color barrier, and
wherein the variable color barrier comprises
a liquid crystal panel with a plurality of liquid crystal cells, wherein each liquid crystal cell behaves as either the first variable filter or the second variable filter,
a first polarizer attached to a surface of the liquid crystal panel of the variable color barrier towards the display device, and
a second polarizer attached to a surface of the liquid crystal panel of the variable color barrier away from the display device.

16. The multi-mode stereoscopic image displaying apparatus according to claim 15, wherein the liquid crystal panel of the display device and the liquid crystal panel of the variable color barrier are separated by a predetermined distance.

17. The multi-mode stereoscopic image displaying apparatus according to claim 15, wherein the second polarizer of the display device and the first polarizer of the variable color barrier are a single polarizer.

18. A multi-mode stereoscopic image displaying apparatus, comprising:
an image signal converter for combining video signals obtained by photographing an object at different angles, and for creating mixed image signals;
a display device having first and second pixels for displaying the mixed image signals received from the image signal converter, each of the first pixels having at least one sub-pixel cell coded with a first color used for creating a left-eye picture and at least one other sub-pixel cell each coded with a color different from the first color and used for creating a right-eye picture and each of the second pixels having at least one sub-pixel cell coded with the first color used for creating the right-eye picture and at least one other sub-pixel cell each coded with the color different from the first color and used for creating the left-eye picture;
a color barrier having first and second color filters adjacent to and alternated with each other, wherein each of said first and second color filters is overlapped with a portion of said first pixels and a portion of said second pixels such that all sub-pixel cells of each of the first pixels are aligned to a left-eye of an observer through at least one first color filter and aligned to a right-eye of the observer through at least one second color filter and all sub-pixel cells each of the second pixels are aligned to the right-eye of the observer through at least one first color filter and aligned to the left-eye of the observer through at least one second color filter and wherein the first color filter transmits a light of the first color while shutting off light of the color different from the first color and the second color filter transmits the light of the color different from the first color while shutting off the light of the first color;
a light-scattering device arranged between the display device and the color barrier,
wherein the light scattering device transmits light from the display device to the color barrier without scatter in response to a first voltage when the light scattering device is in a stereoscopic mode such that the first color from each first pixel and the color different from the first color from each second pixel reaches the left eye of the observer and the first color from each second pixel and the color different from the first color from each first pixel reaches the right eye of the observer, and
wherein the light scattering device scatters the light from the display device to the color barrier in response to a second voltage different from said first voltage when the light scattering device is in a plane mode such that the first color and the color other than the first color from both the first and second pixels reach both the left and right eyes of the observer.

19. The multi-mode stereoscopic image display apparatus according to claim 18, wherein the light-scattering device includes a polymer-dispersed liquid crystal (PDLC).

20. The multi-mode stereoscopic image display apparatus according to claim 18, further comprising:
a mode conversion controller for generating a mode signal for selecting between the stereoscopic mode and the plane mode in accordance with the user instruction;
a voltage source for generating said first and second voltages; and
a switch connected between the light scattering device and the voltage source to apply said first and second voltages to the light scattering device in response to the mode signal.

21. The multi-mode stereoscopic image displaying apparatus according to claim 18, wherein each of said first and second color filters is overlapped with a half portion of said first pixels and a half portion of said second pixels.

22. The multi-mode stereoscopic image displaying apparatus according to claim 18, wherein said first and second color filters are complementary color filters.

* * * * *